United States Patent
Winsler et al.

[15] 3,673,735
[45] July 4, 1972

[54] GLASS PANEL REFRIGERATOR DOOR

[72] Inventors: Robert J. Winsler, Elkton, Ky.; Frederic A. Richter, Chicago, Ill.

[73] Assignee: Ardco, Inc., Chicago, Ill.

[22] Filed: Dec. 31, 1969

[21] Appl. No.: 889,560

Related U.S. Application Data

[62] Division of Ser. No. 611,020, Jan. 23, 1963, Pat. No. 3,499,245.

[52] U.S. Cl. .................................. 49/70, 49/400, 49/478, 49/501
[51] Int. Cl. .......................................... E06b 7/12
[58] Field of Search ............... 49/501, 504, 371, 70, 386, 49/401, 400, 418, 487; 52/501

[56] References Cited

UNITED STATES PATENTS

| | | | |
|---|---|---|---|
| 2,858,408 | 10/1958 | Barroero | 49/410 X |
| 2,987,782 | 6/1961 | Kurowski | 49/386 |
| 3,177,989 | 4/1965 | Di Chiaro | 49/425 |
| 3,331,159 | 7/1967 | Cooke et al | 49/371 |

*Primary Examiner*—Kenneth Downey
*Attorney*—Max Dressler, R. Howard Goldsmith, James W. Clement, Herman J. Gordon, Ernest Cheslow and Jack Shore

[57] ABSTRACT

A glass panel refrigerator door having a glass molding secured by screws to a flange on the door frame, a magnetic gasket mounted on the glass molding, and a gasket molding retaining the gasket on the glass molding and screwed to the glass molding while also clamping the glass molding under another flange on the door frame.

13 Claims, 7 Drawing Figures

PATENTED JUL 4 1972 3,673,735

INVENTORS
Robert J. Winsler
Frederic A. Richter
By: Burmeister, Palmatier + Hamby Attys

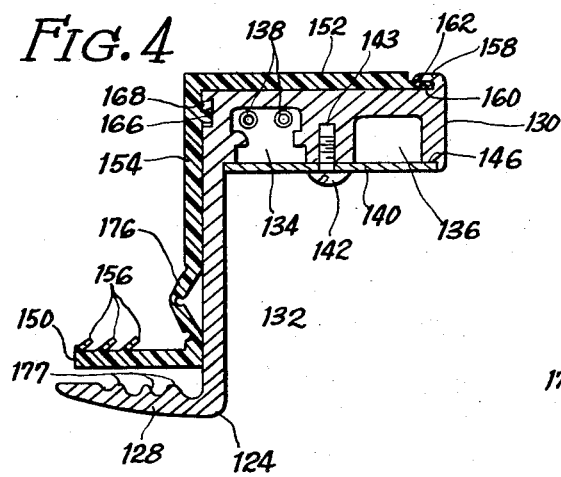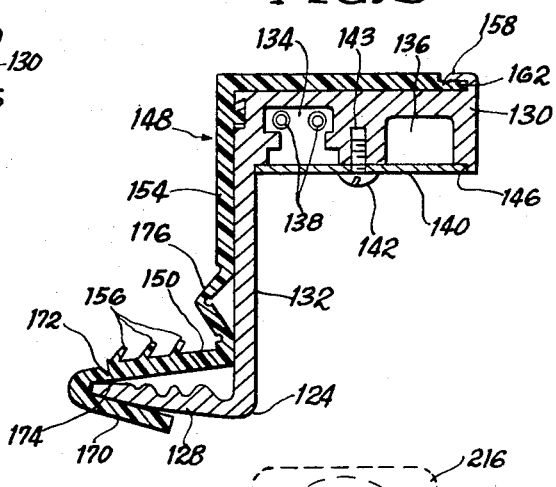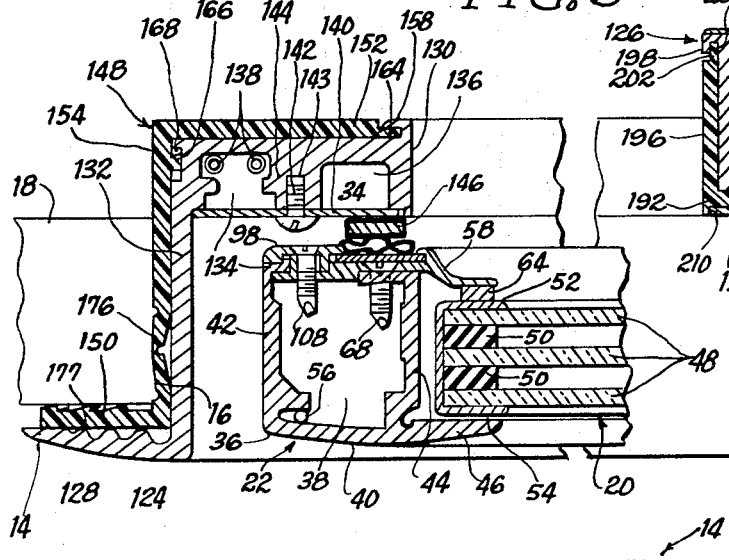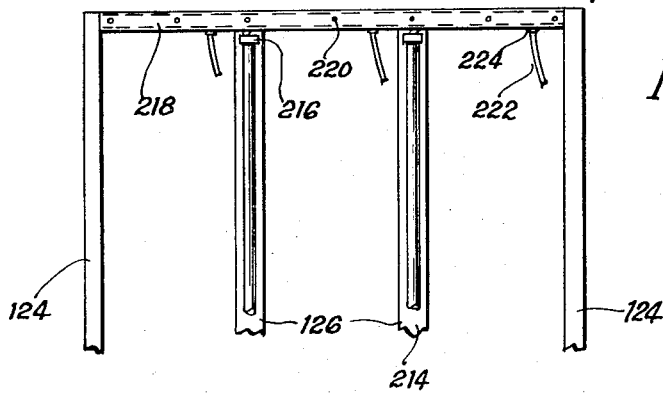

GLASS PANEL REFRIGERATOR DOOR

This application is a division of our copending application, Ser. No. 611,020, filed Jan. 23, 1967 now U.S. Pat. No. 3,499,245 granted Mar. 10, 1970.

This invention relates to glass panel refrigerator doors of the general type represented by the Kurowski U.S. Pat., No. 2,987,782, patented June 13, 1961, and No. 3,131,421, patented May 5,1964. Such refrigerator doors are widely used in supermarkets, convenience food stores, beverage stores and the like for refrigerated display cases and cabinets from which purchasers may select refrigerated beverages, foods and other products. Such doors are used for both normal temperature and low temperature refrigerated cases and cabinets. Normal temperature applications involve the display of dairy products and the like, slightly above freezing temperatures. Low temperature applications involve the display of frozen foods, ice cream and the like, well below freezing temperatures.

The present invention relates particularly to refrigerator doors of the type in which the glass panel is mounted in a metal supporting frame. The metal is generally aluminum, although other metals could be employed. Generally, the door frame is fabricated from aluminum extrusions. The door is generally mounted in a metal outer frame or casing which usually is arranged to support a plurality of doors, side by side. Each door is normally provided with a gasket to form a seal between the door and the frame.

One object of the present invention is to provide a refrigerator door of the foregoing character in which the glass panel and the gasket are mounted on the metal frame of the door in a new and improved manner.

A further object is to provide such a new and improved refrigerator door in which the glass panel and the gasket are secured to the metal frame by means of metal molding strips which are fastened directly to the metal frame.

It is a further object to provide a new and improved refrigerator door of the foregoing character which employs a first set of metal molding strips which are screwed or otherwise secured directly to the metal frame and which support the gasket as well as securing the glass panel in the frame; and a second set of metal molding strips which are screwed or otherwise secured to the first molding strips and have a clamping action between the gasket and the frame, so as to clamp the gasket against the first molding strips, while clamping the first molding strips against the frame.

Another object is to provide a new and improved refrigerator door of the foregoing character in which the door frame is made of metal extrusions with a hollow core, and in which the metal molding strips close the rear side of the hollow core.

A further object is to provide such a refrigerator door in which the metal molding strips are secured directly to the metal extrusions in a new and improved manner, without the aid of a wood core or the like within the extrusions, the need for any such wood core thereby being obviated.

Further objects and advantages of the present invention will appear from the following description, taken with the accompanying drawings, in which:

FIG. 3 is an enlarged cross section taken through the outer frame, and showing the sealing strip for the frame in the condition in which it is shipped from the factory to the point of installation.

FIG. 4 is a cross section similar to FIG. 3, but showing the sealing strip after the protective cover portion thereof has been removed, preparatory to final installation of the frame.

FIG. 5 is a fragmentary horizontal section taken through the door and the outer frame, the sealing strip for the outer frame being shown in its installed position.

FIG. 7 is a fragmentary, somewhat diagrammatic rear elevation of the outer frame for the door assembly.

Figure 1:
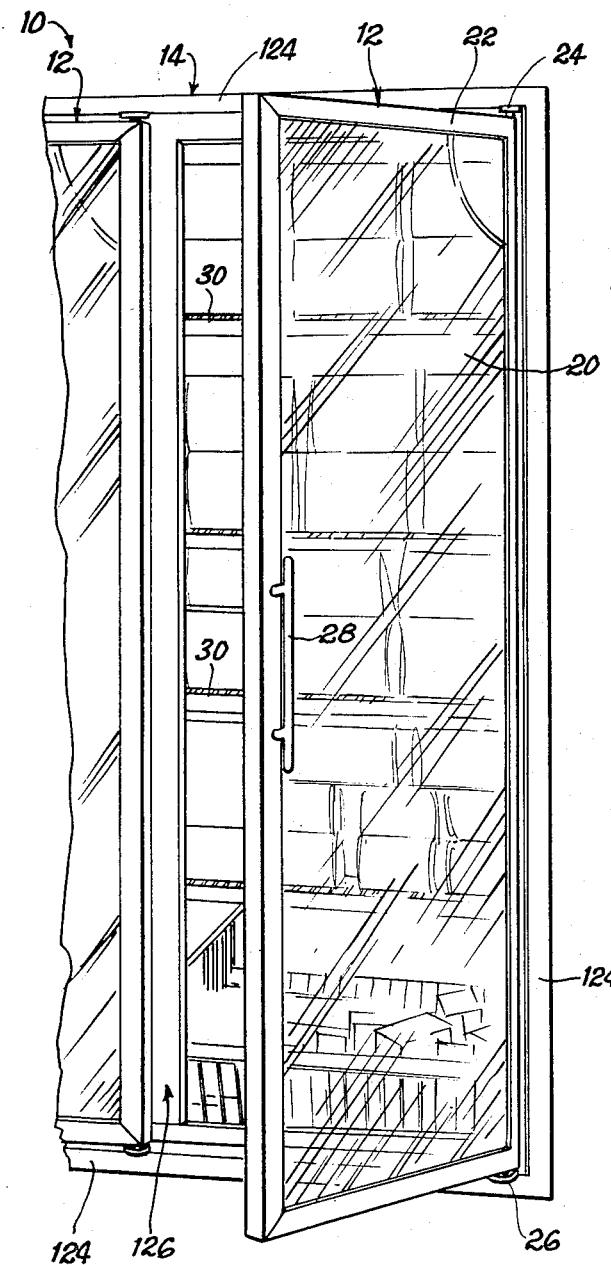
FIG. 1 is a general perspective view of a refrigerator door assembly to be described as an illustrative embodiment of the present invention.

As already indicated, FIG. 1 illustrates a refrigerator door assembly 10, comprising a plurality of doors 12 which are swingably mounted in an outer frame or casing 14. As shown to best advantage in FIGS. 2 and 5, the outer frame 14 is adapted to be mounted within an opening 16 in a wall 18 or the like. It will be understood that the door assembly 10 is adapted to be used on a free standing refrigerated case, or in connection with a built-in cooler or cabinet for refrigerated merchandise.

It will be seen that each door 12 comprises a transparent panel 20 made of glass or other suitable transparent material. The panel 20 is mounted in a frame 22, preferably made of aluminum or some other suitable material. The door frame 22 is swingably mounted in the outer casing 14 by means of suitable upper and lower hinges 24 and 26. Appropriate hinges are disclosed and claimed in the previously mentioned Kurowski patents. A suitable handle 28 is also mounted on the door for use in opening the door.

In the usual case, a plurality of shelves 30 are mounted behind the doors 12 to support merchandise of various kinds. The merchandise may comprise dairy products or the like in the case of a normal temperature cooler, or frozen food or ice cream in the case of a low temperature cooler.

Each door 12 is preferably provided with a gasket or sealing strip 32 to form a seal between the door and the outer frame 14, when the door is closed. It is preferred to employ a gasket of the magnetic type, having magnets 34 therein to hold the door shut and provide firm sealing pressure between the gasket and the outer frame 14.

Figure 6:
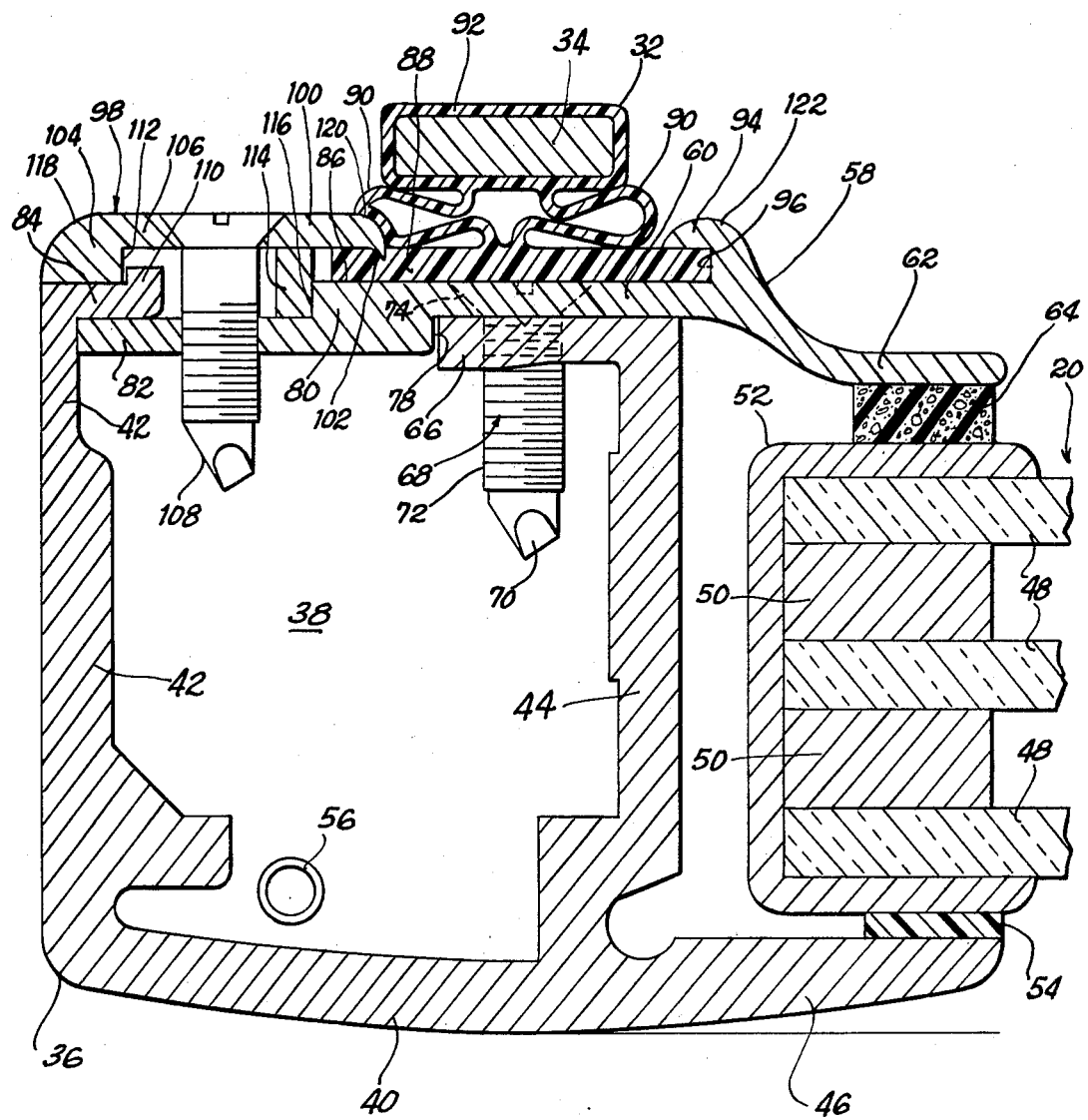
FIG. 6 is a fragmentary enlarged section corresponding to a portion of FIG. 5 and taken through the door.

The door frame 22 is preferably fabricated from a plurality of rectangularly related extrusions or other members 36 made of aluminum or some other suitable metal. As shown in FIGS. 5 and 6, each extrusion 36 is formed with a hollow core 38. The extrusion has a front wall 40, an outer side wall 42, and an inner side wall 44. The side walls 42 and 44 project rearwardly from the front wall 40. The hollow core 38 is formed by the channel-shaped space bounded by the walls 40, 42 and 44.

The glass panel 20 is mounted in the door frame 22, within the space bounded by the inner side walls 44 of the extrusions 36. As shown, each extrusion 36 is formed with a panel supporting flange or lip 46 against which the glass panel 20 is mounted. The flange 46 extends inwardly beyond the inner side wall 44 and constitutes an extension of the front wall 40.

The glass panel 20 is normally of the insulated type, having a plurality of spaced panes 48. The illustrated panel 20 has three panes, but double and quadruple panes are also well known. Spacers 50 are hermetically sealed between the edges of the panes 48, so that moisture will be excluded from the spaces between the panes. The dry air between the panes has a good insulating value.

As shown, a channel-shaped frame may be provided around the edges of the glass panes 48. A soft sealing strip 54 is preferably mounted between the panel 20 and the flange 46. The sealing strip 54 may be made of plastic, rubber or any other suitable soft material.

One or more electrical heating cables 56 are preferably mounted in the hollow core 38 of the door frame 22, to heat the door frame so as to prevent any possible condensation of moisture upon the outer surface of the frame. In the absence of any such heating cable, the frame 22 may be cooled to such an extent by the refrigerator that moisture will be condensed from the atmosphere on the frame, particularly under conditions of high atmospheric humidity.

Molding strips 58, preferably made of aluminum or other suitable metal, are provided to hold the glass panel 20 in the frame 22. The molding strips 58 are preferably in the form of aluminum extrusions. As shown to best advantage in FIGS. 5 and 6, each molding strip 58 has a body portion 60 which is screwed or otherwise secured to the door frame 22. The molding strip 58 has a glass retaining flange 62 which is adapted to project inwardly beyond the inner side wall 44 of the frame extrusion 36. The exact shape of the glass retaining flange 62 depends upon the thickness of the glass panel 20. As shown, the glass retaining flange curves forwardly from the body portion 60 of the molding strip 58.

A soft strip or pad 64 is preferably interposed between the glass retaining flange 62 and the glass panel 20. The pad 64 may be made of rubber, plastic or some other suitable soft material.

The body portion 60 of the glass retaining strip 58 is preferably screwed or otherwise secured to a flange or lip 66 formed on the inner wall 44 of the frame extrusion 36. The illustrated flange 64 extends generally at right angles to the inner wall 44 and projects toward the outer wall 42.

A plurality of self-drilling screws 68 are preferably employed to secure the body portion 60 of the molding strip 58 to the flange 66. The screws 68 extend through the body portion 60 and the flange 66. It will be seen that each screw 68 has a self-drilling point 70, a self-tapping screw shank 72, and a flat self-countersinking head 74 which is recessed into the body portion 60. A suitable power tool may be employed to insert the self-drilling screws 68. To facilitate the accurate location of the screws 68, a locating groove 76 is preferably formed in the rear side of the flange 66. The illustrated groove 76 is generally V-shaped in cross section. The groove 76 extends along the entire length of the flange 66 and is adapted to locate the self-drilling screws 68 in whatever positions they may be inserted.

To provide further assistance in locating the panel molding strips 58, each strip is preferably provided with a shoulder 78 which is adapted to engage the edge of the flange 66. The body portion 60 of the molding strip 58 has an outer portion 80 of the increased thickness to form the shoulder 78.

The illustrated molding strip 58 has an outer flange 82 which projects from the body portion 60 toward the outer side wall 42 of the door extrusion 36. The flange 82 is preferably of reduced thickness relative to the thickened portion 80 and is offset rearwardly relative to the body portion 60.

A rear retaining flange 84 is preferably formed on the outer side wall 42 to engage the flange 82 of the molding strip 58. The retaining flange 84 projects inwardly, generally at right angles to the outer side wall. It will be seen that the flange 84 is offset rearwardly relative to the rear flange 66 on the inner side wall 44. In addition to retaining the glass panel 20, it will be seen that the molding strip 58 closes the rear side of the hollow core or channel 38 in the door extrusion 36. Moreover, the gasket 32 is preferably mounted across the rear side of the molding strip 58. Thus, the body portion 60 is formed with a flat rear surface 86 against which the gasket 32 is mounted. The illustrated gasket 32 has a flat mounting portion or strip 88 adapted to engage the flat surface 86. A pair of flexible pleats or folds 90 are formed integrally with the flat mounting strip 88 and are adapted to extend between the mounting strip and a tubular outer portion 92, within which the magnets 34 of the gasket 32 are mounted.

To retain the gasket 32, the molding strip 58 is formed with a flange or lip 94 which is spaced rearwardly from the inner edge of the body portion 60. The lip 94 forms a channel 96 adapted to receive the inner edge of the flat mounting strip 88. It will be understood that the flat mounting strip 88 of the gasket 32 fits snugly within the channel 96.

A second molding strip 98 is preferably provided to clamp the gasket 32 against the molding strip 58, while also clamping the outer flange 82 of the molding strip 58 against the retaining flange 84 on the door extrusion 36. Preferably, the molding strip 98 is screwed or otherwise secured to the molding strip 58. The second molding strip 98 is preferably in the form of an extrusion made of aluminum or other suitable material.

The illustrated molding strip 98 has an outer gasket retaining flange 100, adapted to clamp the outer edge of the gasket mounting strip 88 against the body portion 60 of the molding strip 58. The flange 100 has a pointed lip or edge 102 which is turned forwardly and is adapted to bite into the mounting portion 88 of the gasket, so as to prevent any possible dislodgement of the gasket.

The illustrated molding strip 98 has an outer flange 104 adapted to engage the retaining flange 84 on the outer side wall 42 of the door extrusion 36. The flange 104 projects forwardly beyond the flange 100.

The molding strip 98 has a body portion 106 between the flanges 100 and 104. It is preferred to employ self-drilling screws 108 to secure the molding strip 98 to the molding strip 58. The conStruction of the screws 108 may be the same as that of the screws 68. It will be seen that the screws 108 extend through the body portion 106 of the molding strip 98, and the outer flange 82 of the molding strip 58. The screws 108 are tapped into the flange 82. The tapering heads of the screws 108 are recessed into the molding strip 98 so as to be flush with the body portion 106.

It will be understood that the screws 108 clamp the flange 100 against the mounting portion 88 of the gasket 32. At the same time, the screws clamp the outer flange 82 of the molding strip 58 against the retaining flange 84 on the outer side wall 42 of the door extrusion 36. Moreover, the screws 108 clamp the outer flange 104 of the molding strip 98 against the rear side of the retaining flange 84.

To assist in locating the molding strip 98, the retaining flange 84 is formed with a rearwardly turned lip 110 which is adapted to be engaged by a shoulder 112, formed on the molding strip 98 between the flange 104 and the body 106. In addition, the molding strip 98 is formed with a locating flange or leg 114 which projects forwardly from the body portion 106 and is adapted to engage the rear side of the flange 82 of the molding strip 58. A shoulder 116 is formed between the flange 82 and the body portion 60 of the strip 58 to engage and locate the flange 114. It will be understood that the flange or leg 114 limits the extent to which the gasket mounting member 88 may be compressed by tightening the screws 108.

The illustrated molding strip 98 has a curved contour 118 on the outside of the flange 104 to form a smoothly rounded corner at the rear of the outer side wall 42. Similarly, the flange 100 has a smoothly rounded contour 120. The lip or flange 94 also has a smoothly rounded outer contour 122.

The outer frame or casing 14 is generally rectangular and preferably comprises a plurality of rectangularly related border members 124. A plurality of vertical mullions 126 are connected between the upper and lower border members to provide for the mounting of a plurality of doors on the outer frame 14. The mullions 126 are mounted at regular intervals, corresponding to the width of the doors.

Figure 2:
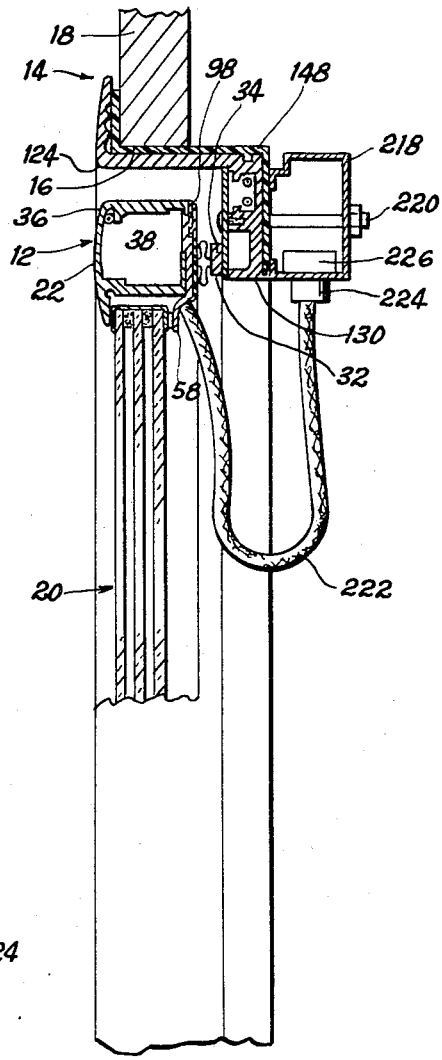
FIG. 2 is a fragmentary vertical section taken through one of the doors and the outer frame.

As shown to best advantage in FIGS. 2 and 5, the border member 124 are preferably in the form of extrusions made of aluminum or some other suitable material. The illustrated border members or extrusions 124 are generally Z-shaped in cross section. Thus, each extrusion 124 comprises a front or outer flange 128, a rear or inner flange 130, and a web or body 132 extending therebetween. The front and rear flanges 128 and 130 project in opposite directions, generally at right angles to the web 132.

When the doors 12 are closed, they are recessed into the frame 14 so as to be generally flush with the front flanges 128 of the border members 124. The rear flanges 130 serve as stops for the doors 12, as do the mullions 126.

The rear flange 130 of each border member 124 is preferably hollow in construction and thus has a hollow core. As illustrated, the rear flange 130 is formed with two channels or grooves 134 and 136 which are adapted to receive one or more electrical heating cables 138. In the illustrated construction, there are two of the heating cables 138 in the channel 134. The heating cables 138 are employed to warm the border members 124 to such an extent as to avoid any condensation of moisture on the border members.

Each rear flange 130 is provided with a cover plate 140 to close the channels 134 and 136. The plate 140 is screwed or otherwise removably secured to the rear flange 130. Thus, the illustrated plate 140 is secured to the flange 130 by means of a plurality of self-tapping screws 142 which are tapped into suitable channels 143 in the flange 130. It will be seen that the flange 130 has a mid portion 144, between the channels 134 and 136. The screws 142 extend through holes in the mid portion of the plate 140 and are tapped into the channels 143 which are formed in the mid portion 144 of the flange 130.

The covering plate 140 spans the open front sides of both of the channels 134 and 136. A recess 146 is preferably formed in the front side of the flange 130, to receive the cover plate 140, so that the cover plate will be flush with the front side of the flange.

Occasionally, it may be necessary to replace the heating cables 138, which may burn out after extended service. The heating cables may easily be removed and replaced by removing the cover plates 140. This may be done simply by removing the screws 142.

The cover plates 140 also preferably serve as magnetic members to attract the magnets 134 of the magnetic gasket 132. Thus, the cover plates 140 are preferably made of magnetic stainless steel, or other suitable magnetic material. It will be seen from FIG. 5 that the gaskets 132 are adapted to engage the cover plates 140. The magnets 134 provide firm pressure between the gaskets 132 and the cover plates 140.

As already indicated, the outer frame 14 is normally mounted within an opening 16 in the front wall 18 of the refrigerator case or cabinet. A sealing strip 148 is preferably provided between the outer frame 14 and the wall 18. The sealing strip 148 is normally made of plastic, rubber or other soft material. As shown, the sealing strip 148 is generally Z-shaped, to cover virtually the entire rear surface of the Z-shaped border extrusion 124. Thus, the sealing strip 148 has a front flange 150, a rear flange 152, and a web or body 154, extending therebetween. The front flange 150 is adapted to be interposed between the wall 18 and the front flange 128 of the border extrusion 124. The rear side of the front flange 150 is preferably formed with a plurality of sealing lips or flaps 156, adapted to engage the wall 18.

The rear flange 152 covers the rear side of the rear flange 130 on the extrusion 124. Similarly, the web 154 covers the outside of the web 132 and is adapted to be interposed between the web 132 and the wall 18.

To retain the sealing strip 148, an L-shaped lip or flange 158 is preferably formed on the rear inner corner of the rear flange 130. The lip 158 forms a channel 160 adapted to receive a reduced edge portion 162 on the rear flange 152 of the sealing strip 148. After the reduced portion 162 of the sealing strip 148 has been inserted into the channel 160, the lip 158 is preferably struck inwardly at intervals to form spaced points 164 which dig into the sealing strip and prevent it from becoming detached from the flange 130.

A key or tongue 166 is preferably formed on the inner side of the web 154 of the sealing strip 148, for reception in a groove or channel 168, formed in the outer side of the flange 130, near the rear corner thereof. The key 166 interlocks with the groove 168 to assist in retaining the sealing strip 148 on the extrusion 124. It will be seen that the key 166 and the groove 168 are of dovetail shape, to provide secure interlocking therebetween.

Initially, the sealing strip 148 is preferably formed with an additional flange 170 which is attached to the front flange 150 and is adapted to be wrapped around the front of the front flange 128 on the extrusion 124, as shown in FIG. 3. It will be seen that the flange 170 is generally J-shaped in cross section. The wrap-around flange 170 protects the outer edge and front surface of the extrusion 124 during the shipment and handling of the outer frame 14. When the outer frame 14 is ready to be installed, the wrap-around flange 170 is torn or ripped off the front flange 150, as shown in FIG. 4. To facilitate the removal of the flange 170, a deep groove 172 is formed between the flange 170 of the outer edge of the front flange 150. It will be understood that the flange 170 is torn off along the groove 172. The provision of the groove 172 leaves only a thin web 174 which offers little resistance to the removal of the flange 170.

To assist in retaining the sealing strip 148 on the extrusion 124 during shipment and handling, the web or body portion 154 of the sealing strip is preferably formed with a dog-leg portion 176 which acts as a spring. The dog-leg portion 176 is initially L-shaped in cross section, as shown in FIG. 3. It will be understood that the dog-leg portion 176 can be straightened to facilitate the mounting of the flange 170 around the front flange 128 of the extrusion 124. The spring action of the dog-leg portion 176 then retains the flange 170 on the extrusion flange 128.

When the outer frame 14 is installed, the flange 170 is torn off, whereupon the sealing strip 154 assumes the position shown in FIG. 4, with the dog-leg portion 176 in its initial or L-shaped position. The frame 14 is inserted into the opening 16 and is pushed rearwardly so that the front flange 150 of the sealing strip 148 is compressed between the wall 18 and the front flange 128 of the extrusion 124. As a result, the dog-leg 176 is straightened out, as shown to best advantage in FIG. 5. The front flange 128 is formed with ridges 177 for engaging the sealing strip 148.

Each of the illustrated mullions 126 is generally channel-shaped and thus comprises a front wall 180 and a pair of rearwardly projecting flanges or side walls 182. The front wall 180 is preferably formed with one or more grooves or channels 184 to receive electrical heating cables 186. Two such cables 186 are illustrated. It will be understood that the cables 186 heat the mullions 126 to a sufficient extent to prevent condensation of moisture on the mullions.

The channels 184 for the heating cables are closed by a removable cover plate 188 which is screwed or otherwise secured to the front wall 180 of the mullion 126. In this case, a plurality of self-tapping screws 190 extend through holes in the plate 188 and are tapped into channels 191 in the mullion 126.

The cover plates 188 on the mullions 126 also preferably serve as magnetic armatures for the magnetic gaskets 132. Thus, the cover plates 188 are preferably made of a stainless steel having magnetic characteristics or some other suitable magnetic material.

To provide heat insulation, the side flanges 182 and portions of the front wall 180 of each mullion 126 are preferably covered with cover strips 192, made of plastic, rubber or other suitable material. As shown in FIG. 5, each mullion 126 is preferably equipped with two of the strips 192, each of which covers one side flange 182 and the adjacent portion of the front wall 180.

Thus, each of the illustrated cover strips 192 is generally L-shaped in cross section and is provided with a front leg 194 and a side leg 196. Means are preferably provided for securely fastening the cover strips 192 to the mullion 126. As shown, a generally L-shaped lip or flange 198 is formed on each of the rearwardly projecting flanges 182 of the mullion 126. Each lip 198 forms a channel or groove 200, adapted to receive a reduced edge portion or flange 202 on the corresponding cover strip 192. After the flange 202 has been inserted into the channel 200, the lip 198 may be bent inwardly against the flange 202 at intervals along the length of the mullion, so that the flange 202 will be securely clamped in place.

Similarly, the illustrated mullion 126 is formed with L-shaped flanges or lips 204 to retain reduced edge portions or flanges 206 on the front legs 194 of the cover strips 192. Each lip 204 forms a channel or groove 208 adapted to receive the reduced edge portion 206. The lip 204 may be bent rearwardly at intervals so as to clamp the reduced edge portion 206 in place.

As shown in FIG. 5, the cover strips 192 are formed with recesses 210 to receive the magnetic cover plate 188. The front legs 194 of the cover strips 126 are clamped against the mullion 126 by the cover plate 188.

Each mullion 126 is hollow, in that a channel-shaped opening 212 is formed therein. Thus, the mullions may be employed very advantageously as raceways or conduits for electrical wiring. The rear side of each mullion 126 is preferably closed by a removable plate 214 which conceals the electrical wiring and also acts as a mounting plate for one or more electrical lighting fixtures 216. Electrical wiring may be installed in the mullions to supply electricity to the electric lighting fixtures 216 and also to the heating cables 186.

As shown in FIGS. 2 and 7, a channel-shaped raceway 218 is preferably mounted on the rear side of the upper horizontal frame member or extrusion 124. Suitable bolts or screws 220 may be employed to secure the raceway 218 to the rear flange 130 of the outer frame extrusion 124. Interconnecting openings may be provided between the raceway 218 and the upper ends of the channels 212 in the mullions 126. Thus, wiring may be brought into the mullions through the raceway 218.

As shown in FIGS. 2 and 7, flexible electrical cords 222 are preferably employed to supply electrical energy to the doors 12, to energize the heating cables 56 therein. The cords 222 extend into the upper horizontal extrusions 36 of the doors 12 and are connected to the heating cables 56 therein. The other end of each cord 222 is preferably provided with a plug 224 adapted to be inserted into a suitable receptacle 226 on the upper horizontal raceway 218. Suitable wiring may be provided in the raceway 218 to supply electrical energy to the various receptacles 226. It will be understood that the cords 222 are long enough to provide for free opening of the doors 12.

SUMMARY OF OPERATION

While the installation and operation of the refrigerator door assembly 10 have been described, it may be helpful to offer a brief summary. For shipment and handling, the protective flanges 170 are provided on the insulating and sealing strip 148, as shown in FIG. 3. The dog-leg portion 176 provides a spring action which retains the protective flange 170 on the front flange 128 of the outer frame extrusion 124.

The outer frame 14 is inserted loosely into the opening 16, and then the protective flange 170 is torn off along the groove 172, as shown in FIG. 4. The outer frame 14 is then securely pressed against the wall 18, as shown in FIG. 5, so as to straighten out the dog-leg portion 176. The flaps or lips 156 form a tight seal against the wall 18.

During the normal use of the doors 12, the magnetic cover plates 140 and 188 on the outer frame member 124 and the mullions 126, respectively, form magnetic armatures for the magnets 34 in the magnetic gaskets 32. The gaskets 32 are securely retained on the doors by the lips 94 on the glass molding strips 58, and also by the flanges 100 on the outer molding strips 98.

Occasionally, the heating cables 138 in the outer frame 14 may burn out, in which case it is necessary to change the heating cables. This may be done very easily by removing the cover plates 140 from the rear flanges 130 of the outer frame extrusions 124. It is a simple matter to remove the cover plates 140, by unscrewing the screws 142.

Similarly, the heating cables 186 in the mullions 126 may be changed very easily by unscrewing the screws 190 and removing the cover plates 188. It will be evident that full access to the heating cables 138 and 186 is available from the front of the outer frame 14. It is never necessary to remove the outer frame 14 from the wall opening 16 to change the heating cables. It is only necessary to remove the magnetic stainless steel cover plates 140 and 188, which is an easy operation.

Occasionally, it may also become necessary to change the heating cables 56 in the doors 12. This may be done quite easily by removing the molding strips 98 and 58. The outer molding strips 98 may be removed by unscrewing the screws 108. The gasket 32 is then removed, so that the screws 68 may be unscrewed to remove the glass molding strips 58. Full access may then be had to the heating cables 56 within the hollow cores 38 of the door extrusions 36.

It will be recognized that the refrigerator door assembly 10 is easy to install and also easy to service in the field. The door assembly is ruggedly built so that it will withstand hard service and give a long trouble-free life.

Various other modifications, alternative constructions, and quivalents may be employed without departing from the true spirit and scope of the invention, as exemplified in the foregoing description and defined in the following claims.

We claim:
1. In a refrigerator door,
the combination comprising a door frame,
a transparent panel mounted in said frame,
said frame comprising a plurality of rectangularly related frame members,
each of said frame members being generally channel-shaped and having a front wall with inner and outer side walls projecting rearwardly from said front wall,
each frame member having an open rear side,
said frame members having panel supporting flanges projecting inwardly beyond said inner side walls and adjacent said front walls,
said transparent panel being mounted against said panel supporting flanges,
said inner side wall of each frame member having a first rear flange projecting from the rear portion thereof toward said outer side wall,
said outer side wall of each frame member having a second rear flange projecting from the rear portion thereof toward said inner side wall,
a plurality of rectangularly related panel molding strips mounted on said frame members and retaining said transparent panel in said frame and against said panel supporting flanges,
said panel molding strips being mounted directly against said first rear flanges,
a plurality of first removable fasteners for securing said panel molding strips to said first rear flanges,
a gasket mounted against said panel molding strips,
a plurality of gasket molding strips for clamping said gasket against said panel molding strips,
each of said gasket molding strips having an inner edge portion engaging said gasket and an outer edge portion engaging the rear side of said second rear flange,
each of said panel molding strips having an outwardly extending portion engaging the front side of said second rear flange to close the open rear side of the frame member,
and a plurality of second removable fasteners for securing each gasket molding strip to said outwardly extending portion of the corresponding panel molding strip.
2. A combination according to claim 1,
in which each panel molding strip comprises a lip for retaining said gasket thereon,
said gasket having an inner edge portion retained under said lip.
3. A combination according to claim 1,
in which said first fasteners comprise screws extending through openings in said panel molding strips and tapped into said first rear flanges.
4. A combination according to claim 1,
in which said second fasteners comprise screws extending through openings in said gasket molding strips and tapped into said panel molding strips.
5. A combination according to claim 1,
including electrical heating cables mounted within said channel shaped frame members adjacent said front walls thereof,
said heating cables being accessible by removing said gasket molding strips and said panel molding strips.
6. In a refrigerator door,
the combination comprising a door frame,
a transparent panel mounted in said frame,
said frame comprising a plurality of rectangularly related frame members,
each of said frame members being generally channel-shaped and having a front wall with inner and outer side walls projecting rearwardly from said front wall,
each frame member having an open rear side,
said frame members having panel supporting flanges projecting inwardly beyond said inner side walls and adjacent said front walls,
said transparent panel being mounted against said panel supporting flanges, a plurality of rectangularly related panel molding strips mounted on said frame members and retaining said transparent panel in said frame and against said panel supporting flanges, said panel molding strips being mounted directly against said inner side walls, a plurality of first removable fasteners for securing said panel molding strips to said inner side walls, said panel molding strips having outer portions closing the open rear sides of said frame members, a gasket mounted against said panel molding strips, a plurality of gasket molding strips for clamping said gasket against said panel molding strips, and a plurality of second removable fasteners for securing said gasket molding strips to said outer portions of said panel molding strips.

7. A combination according to claim 6, in which said first removable fasteners comprise screws tapped into said inner side walls.

8. A combination according to claim 6, in which said second removable fasteners comprise screws tapped into said panel molding strips.

9. A combination according to claim 6, in which each of said outer side walls is formed with a rear flange projecting toward the corresponding inner side wall, said panel molding strips and said gasket molding strips being engaged with opposite sides of said rear flanges.

10. A combination according to claim 9, in which said gasket molding strips and said rear flanges are formed with interengageable shoulders for locating said gasket molding strips.

11. A combination according to claim 6, in which said gasket molding strips and said panel molding strips are formed with interengageable shoulders for locating said gasket molding strips.

12. A combination according to claim 6, in which said panel molding strips and said inner side walls are formed with interengageable shoulders for locating said panel molding strips.

13. A combination according to claim 6, in which said inner side walls are formed with outwardly projecting rear flanges for supporting said panel molding strips, said first removable fasteners comprising screws tapped into said outwardly projecting rear flanges.

* * * * *